(12) United States Patent
Nader

(10) Patent No.: US 8,337,356 B2
(45) Date of Patent: Dec. 25, 2012

(54) AXIAL THRUST LOAD REDISTRIBUTION SYSTEM AND METHOD FOR AN AUTOMOTIVE TRANSMISSION

(75) Inventor: Gregg A. Nader, Libertyville, IL (US)

(73) Assignee: Sonnax Industries, Inc., Bellows Falls, VT (US)

( * ) Notice: Subject to any disclaimer, the term of this patent is extended or adjusted under 35 U.S.C. 154(b) by 455 days.

(21) Appl. No.: 12/755,877

(22) Filed: Apr. 7, 2010

(65) Prior Publication Data

US 2011/0251015 A1 Oct. 13, 2011

(51) Int. Cl.
F16H 57/00 (2006.01)
(52) U.S. Cl. ......................................... 475/331; 475/292
(58) Field of Classification Search .................. 475/292, 475/312, 318, 324, 281, 283, 285, 287, 289, 475/291, 331
See application file for complete search history.

(56) References Cited

U.S. PATENT DOCUMENTS

| | | | | |
|---|---|---|---|---|
| 3,741,037 | A * | 6/1973 | Piret .............................. | 475/148 |
| 5,348,518 | A * | 9/1994 | Taniguchi et al. ............. | 475/285 |
| 6,066,066 | A * | 5/2000 | Collins et al. .................. | 475/331 |
| 6,149,543 | A * | 11/2000 | Breen ............................ | 475/269 |
| 6,561,944 | B2 | 5/2003 | Lu et al. | |
| 7,189,182 | B2 * | 3/2007 | Stevenson et al. ............ | 475/292 |
| 7,608,010 | B2 * | 10/2009 | Briscoe ......................... | 475/331 |

OTHER PUBLICATIONS

Hydra-Matic 4L60-E, Second Edition, Technician's Guide; General Motors; 17001.18-1A; HM-4L60-E-TG; Jun. 2000.

* cited by examiner

*Primary Examiner* — Sherry Estremsky
(74) *Attorney, Agent, or Firm* — Downs Rachlin Martin PLLC

(57) ABSTRACT

A system and method for altering the axial thrust load path within an automobile transmission eliminates the component end play in the transmission's roller clutch inner race and induces component end play in the transmission's rear sun gear. The resulting configuration moves portions of the axial thrust load path to across the roller clutch inner race and away from at least the transmission's sun gear and the reaction shell splines of the reaction shell. The system may include a kit in which an axially shortened roller clutch inner race and an appropriately sized bearing are provided. Additional kit components may include an axially shortened reaction shell. Alternatively, the roller clutch inner race and/or reaction shell may be shortened manually. A method of altering a preexisting transmission to have a new axial thrust load path is also provided.

21 Claims, 5 Drawing Sheets

AXIAL THRUST LOAD REDISTRIBUTION SYSTEM AND METHOD FOR AN AUTOMOTIVE TRANSMISSION

FIELD OF THE INVENTION

The present invention generally relates to the field of automotive transmissions. In particular, the present invention is directed to an axial thrust load redistribution system and method for an automotive transmission.

BACKGROUND

An automotive transmission alters the power generated by a vehicle's engine and transmits the resultant power to a drive shaft, which turns the vehicle's wheels. Bridging between the engine output and the drive shaft requires consideration of the axial thrust load forces exerted by the drive shaft, torque converter, and forces generated by the helical cut gears within the transmission during operation of the vehicle. The axial thrust load forces result from the vehicle's suspension moving up and down in response to road conditions and thereby moving the drive shaft up and down at one end so as to cause the drive shaft to pivot about a universal joint located near the transmission. The arcuate movement of the drive shaft as it pivots and the generally fixed distance between the transmission and the suspension work together to create axial loads in the transmission during suspension movement. In general, the transmission endures the axial thrust load forces along an axial thrust load path that traverses several transmission components. Over time, these axial thrust load forces lead to transmission component failure.

SUMMARY OF THE DISCLOSURE

A transmission comprising a reaction shell spline and having an original-equipment axial thrust load path traversing the reaction shell spline, the transmission comprising: a transmission housing; an output shaft rotatable relative to the transmission housing, the output shaft having a rotational axis; a reaction shell coaxial with the rotational axis and including a cylindrical first portion proximate the transmission housing, and a cylindrical second portion proximate the output shaft; a roller clutch inner race having an edge proximate the second portion of the reaction shell; and a bearing disposed between the reaction shell and the edge, wherein the bearing and the roller clutch inner race are sized and configured to remove the original-equipment axial thrust load path from the reaction shell spline.

A replacement kit for an automatic transmission having a preexisting roller clutch inner race and a preexisting spacer, the preexisting roller clutch inner race and the preexisting spacer having an original-equipment combined axial length, the replacement kit comprising: a replacement roller clutch inner race having an axial length that is shorter relative to the preexisting roller clutch inner race; and a replacement bearing sized such that the replacement roller clutch inner race and the replacement bearing have, when installed in the automatic transmission, a combined axial length greater than the original-equipment combined axial length.

A method of redistributing axial thrust loads in a transmission, comprising: removing a roller clutch race from the transmission; shortening the axial length of the roller clutch inner race; remounting the roller clutch inner race in the transmission; and inserting a bearing proximate the roller clutch inner race.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

As mentioned in the Background section above, drivetrain axial thrust loads can lead to the failure of certain components inside a transmission. The present disclosure includes ways of configuring axial thrust load paths through transmissions in a manner that reduces the incidences of failure of those components due to drivetrain axial thrust loads. For the sake of illustration, a detailed example of an axial load path modification is described below in the context of a fairly common automatic transmission, the model 4L60E transmission manufactured by General Motors, Detroit, Mich. (GM). As will be understood by those skilled in the art, though this particular transmission is used to illustrate concepts of the present invention, other transmissions may benefit from application of these concepts, such as GM model numbers 700-R4, 4L60, 4L65E, or 4L70. In addition, it is noted that while the following example is based on retrofitting an existing original equipment transmission, i.e., the 4L60E transmission, using aftermarket parts (which could be sold as a kit), the disclosed invention can be implemented in a newly designed transmission. That said, before proceeding with a detailed description of various concepts of the present invention in a retrofit context of the 4L60E transmission, the 4L60E transmission and its axial thrust load path at a critical location within the transmission are first described to give the reader a firm understanding of the issues.

Figure 1A:
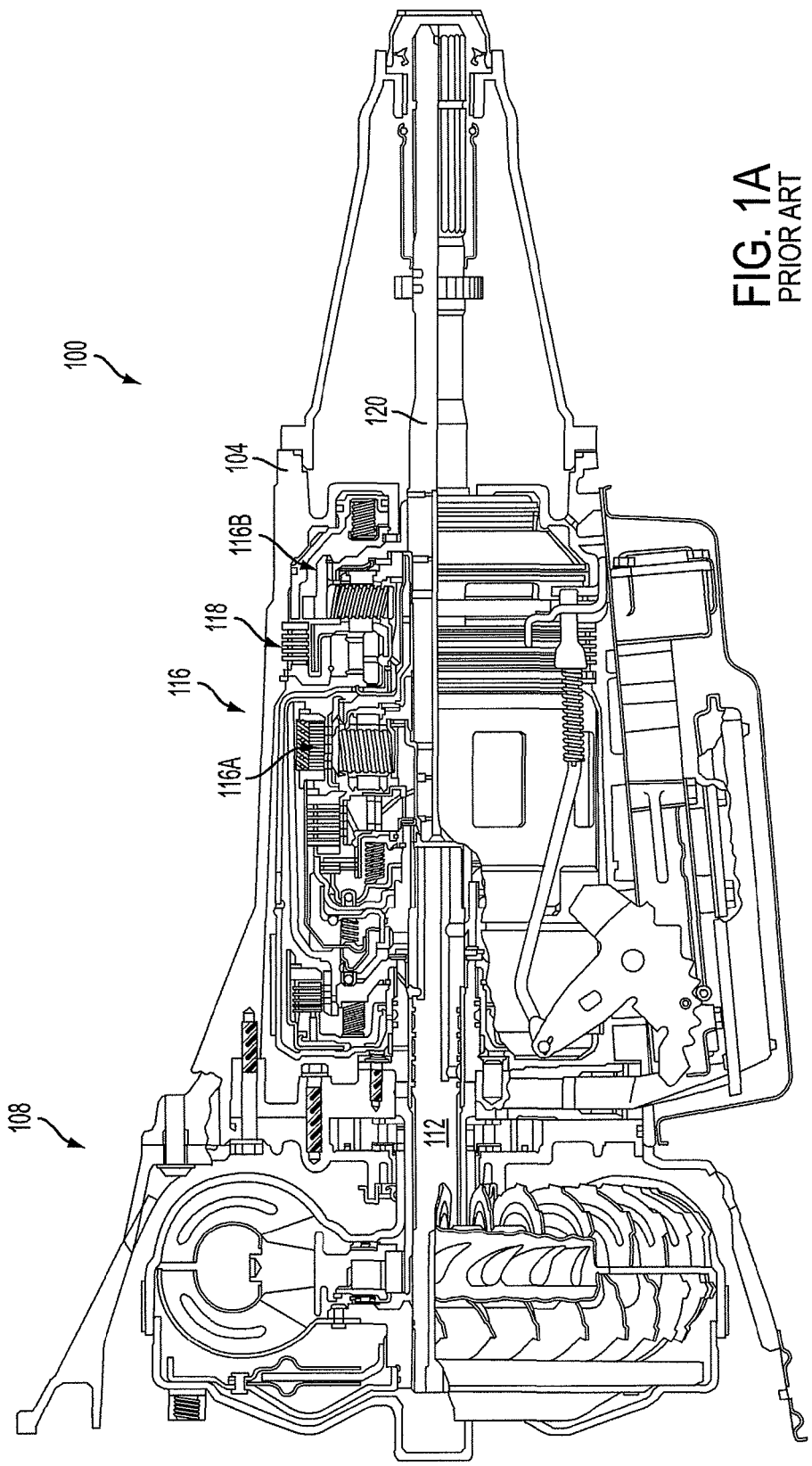
FIG. 1A is a partial longitudinal cutaway/partial longitudinal cross-sectional view of a prior art automotive transmission.

Referring now to FIG. 1A, this figure shows a prior art automatic transmission 100, particularly the GM 4L60E transmission. At a high level, transmission 100 includes, among other things, a housing 104, a torque converter 108, an input shaft 112, a pair of planetary gear sets 116 (i.e., front and rear gear sets 116A-B, respectively), a plurality of friction elements 118, and an output shaft 120. When in service, transmission 100 is mounted to a vehicle's engine (not shown), with torque converter 108 coupled to the engine's crank shaft (not shown). Torque converter 108 modifies the rotational power (torque and speed) from the engine crank shaft and transmits the resultant power to input shaft 112. Input shaft 112 rotates planetary gear sets 116, which are engaged with the output shaft 120 via one or more friction elements 118. Planetary gear sets 116 (described further below) alter the power received from input shaft 112 and transmit the resultant power to output shaft 120. Output shaft 120 is coupled to the vehicle's drive shaft (not shown), which drives the wheels of the vehicle with the power provided by the output shaft.

Figure 1B:
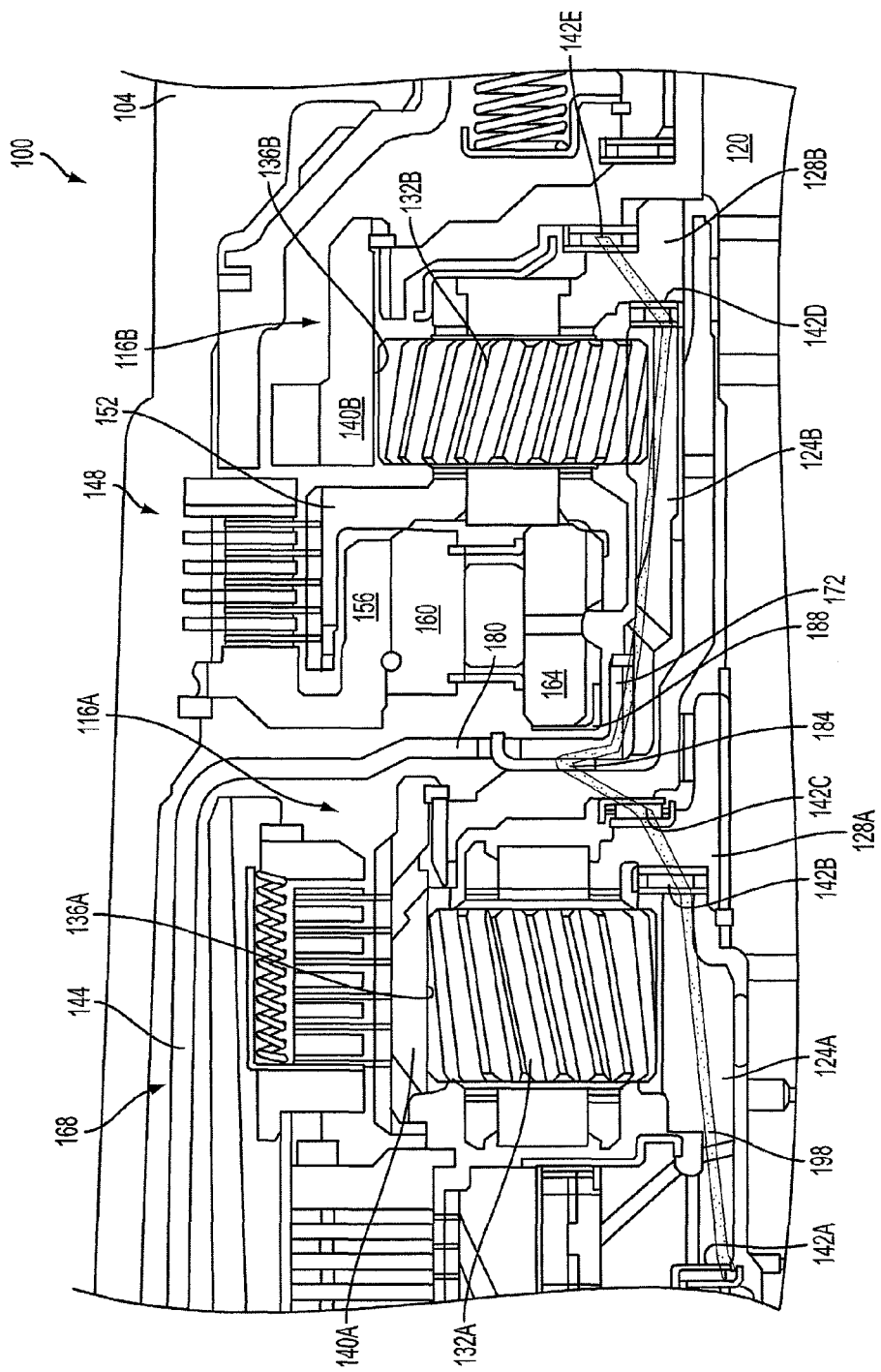
FIG. 1B is an enlarged partial longitudinal cutaway/partial longitudinal cross-sectional view of the automotive transmission of FIG. 1A, showing the path that axial thrust loads applied by a drive shaft take through various components of the transmission.

FIG. 1B illustrates a portion of transmission 100, with a focus on front planetary gear set 116A and rear planetary gear set 116B, which are longitudinally spaced along transmission 100. Each planetary gear set 116 includes a respective sun gear 124A-B, a respective planetary carrier 128A-B, corresponding pinion gears 132A-B, a respective ring gear 136A-B, and a corresponding gear support housing 140A-B (best seen in FIG. 1C and described further below). A plurality of bearing assemblies 142A-E are disposed between adjacent components of transmission 100 in order to provide for the relative rotation of one component to another. In between front planetary gear set 116A and rear planetary gear set 116B are a reaction shell 144 and a clutch assembly 148, which includes a roller clutch housing 152, a roller clutch outer race 156, a roller clutch 160, and a roller clutch inner race 164, among other things.

Reaction shell 144 is a unitary structure that surrounds the front planetary gear assembly 116A. Reaction shell 144 is sized and configured such that a cylindrical first portion 168 of the reaction shell is located proximate housing 104 and a cylindrical second portion 172 of the reaction shell is located proximate output shaft 120. The interior surface of second portion 172 includes a set of splines 176 that engage a portion of rear planetary gear assembly 116B. First portion 168 and second portion 172 are joined via a back member 180. A thrust washer 184 rests interpose back member 180 and front planetary gear assembly 116A, thus allowing for the rotation of front planetary gear assembly independent of reaction shell 144. Thrust washer 184 is typically a long-wearing flat bearing in the shape of a washer that transmits and resolves axial forces between rotating components to keep them aligned along a shaft.

Roller clutch housing 152 surrounds roller clutch outer race 156, roller clutch 160, and roller clutch inner race 164, with the roller clutch outer race and roller clutch being coupled to the roller clutch housing. Roller clutch inner race 164 is splined on its inner surface to a portion of the rear planetary gear set 116B. The forward edge of roller clutch inner race 164 rests proximate a washer 188, which allows for the rotation of the roller clutch inner race relative to reaction shell 144.

Figure 1C:
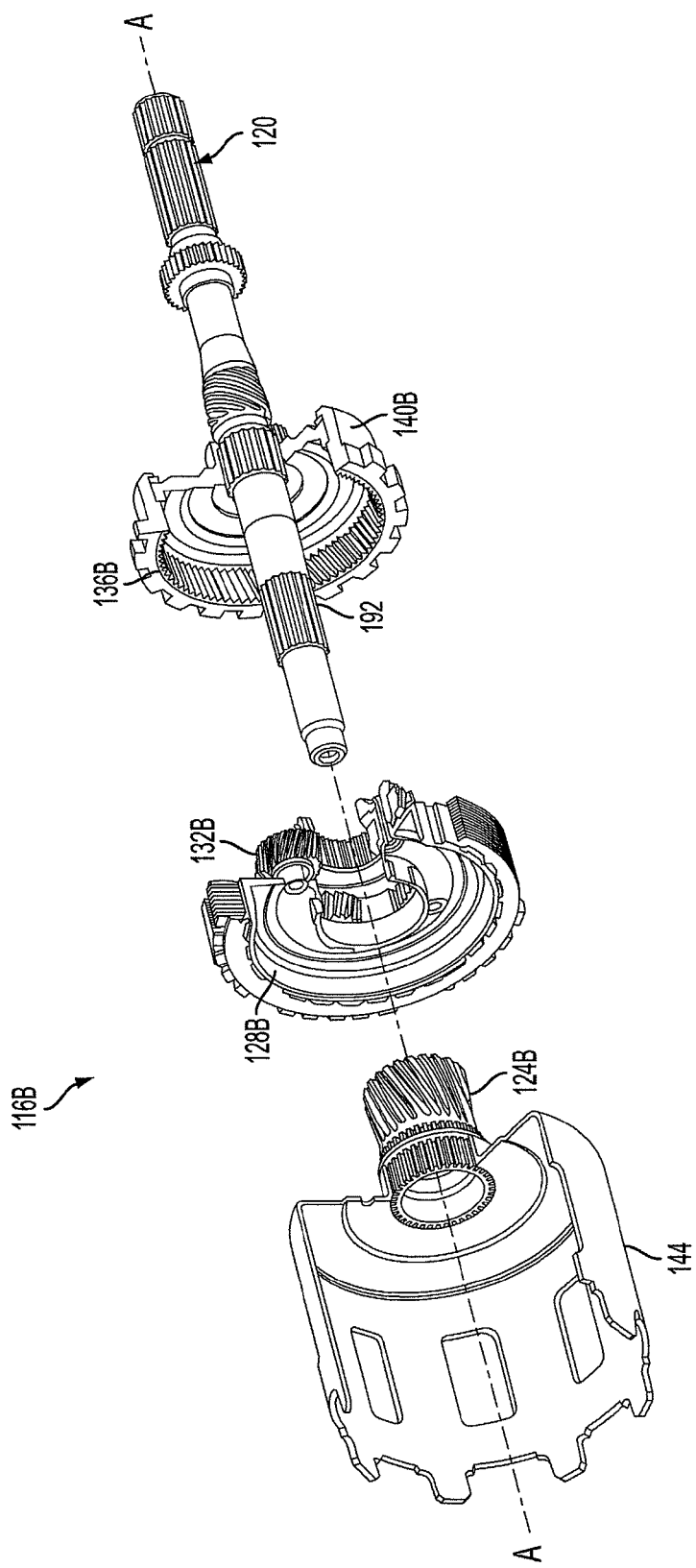
FIG. 1C is a partially exploded partial cutaway isometric view of one of the planetary gear sets of the automotive transmission of FIG. 1A.

FIG. 1C illustrates a partially exploded view of rear planetary gear set 116B of FIGS. 1A and 1B that should give the reader a better sense of the components of this gear set. As mentioned above, rear planetary gear set 116B includes planetary carrier 128B that carries pinion gears 132B. Pinion gears 132B are rotatably mounted in concentric relation to longitudinal axis A-A. In this arrangement, pinion gears 132B are disposed in evenly spaced relation between ring gear 136B, formed in adjacent gear support housing 140B, and sun gear 124B, mounted to reaction shell 144. Sun gear 124B, rear planetary gear set 116B, and gear support housing 140B engage mating splines 192 on output shaft 120. As would be readily apparent to a person skilled in the art, and as is evident from FIG. 1B, front planetary gear set 116A and rear planetary gear set 116B have substantially similar configurations and therefore a full description of front planetary gear set 116A is unnecessary.

Returning to FIG. 1B, bearing assemblies 142A-E are disposed in transmission 100 to allow for the rotation of adjacent components. For instance, bearing assembly 142A allows for the rotation of sun gear 124A with respect to input shaft 112; bearing assembly 142B allows for the rotation of planetary carrier 128A with respect to sun gear 124A; bearing assembly 142C allows for the rotation of planetary carrier 128A relative to gear support housing 140A; and so forth. Typically, bearing assemblies 142 are generally disk shaped, having an inner and outer radius. The space between the inner and outer radius is occupied by a roller, or needle, bearing.

Some parts in transmission 100, such as roller clutch inner race 164, have a small amount of play, typically called "component end play," that allows the component to move axially within the transmission relative to other components. For instance, roller clutch inner race 164 has end play, allowing it to move forward and backward relative to the longitudinal axis of housing 104. In contrast, sun gear 124A, at the junction of reaction shell 144 and sun gear 124B, does not typically have component end play.

Bearing assemblies 142 and thrust washer 184 promote, when combined with the other previously described components of transmission 100, the route for an axial thrust load path 198. As described previously, axial thrust loads are generated in part by the vertical movement of the drive shaft, which occurs when the vehicle's suspension moves relative to the vehicle's body. As described in the Background section above, vertical movement of one end of the drive shaft with the suspension movement changes the location of output shaft 120, such that the output shaft moves axially (i.e., backwards and forwards relative to the vehicle's engine) with respect to the rest of the transmission and thus places stress on the components along axial thrust load path 198.

In transmission 100, axial thrust load path 198 traverses, from left to right, bearing assembly 142A, sun gear 124A, bearing assembly 142B, planetary carrier 128A, bearing assembly 142C, gear support housing 140A, thrust washer 184, reaction shell 144 (proximate reaction shell splines 176), sun gear 124B, bearing assembly 142D, planetary carrier 128B, and bearing assembly 142E.

Figure 2:
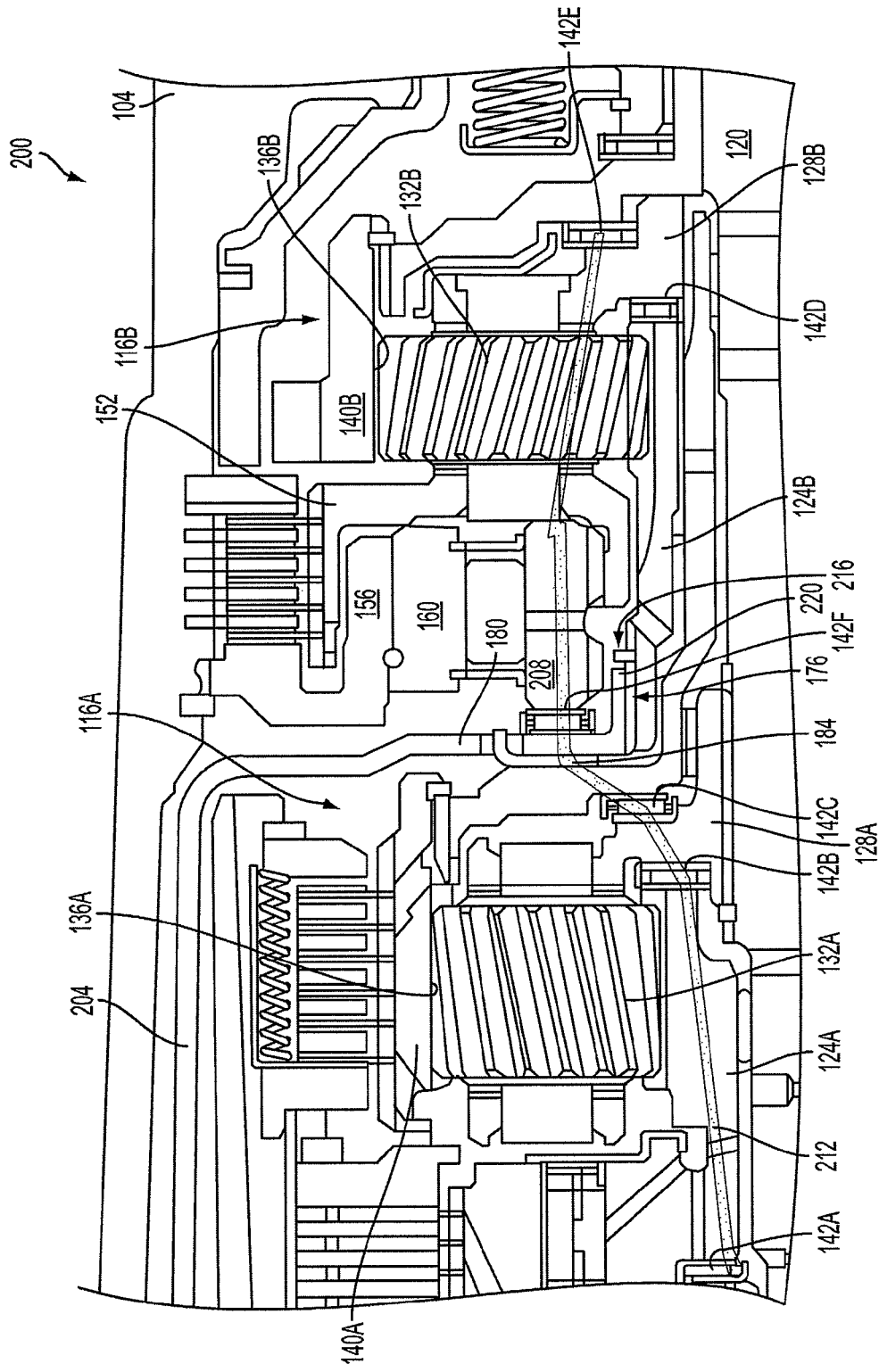
FIG. 2 is an enlarged partial longitudinal cutaway/partial longitudinal cross-sectional view of the automotive transmission, showing the path that axial thrust loads applied by a drive shaft take through various components of the transmission.

FIG. 2 illustrates a portion of an exemplary transmission 200 made in accordance with the present invention. Specifically, example transmission 200 is a modified version of transmission 100 of FIGS. 1A-C, which has been retrofitted to change portions of the axial thrust load path through the transmission. Therefore, generally, transmission 200 includes many of the same components described above, such as, housing 104, torque converter (not shown), input shaft 112 (not shown), planetary gear sets 116 (i.e., front and rear gear sets 116A-B, respectively), friction elements (not shown), and output shaft 120. Planetary gear sets 116 include respective sun gears 124A-B, respective planetary carriers 128A-B, corresponding pinion gears 132A-B, a respective ring gears 136A-B, and corresponding gear support housings 140A-B (best seen in FIG. 1C and described further below). Between front planetary gear set 116A and rear planetary gear set 116B is a reaction shell 204, a roller clutch housing 152, a roller clutch outer race 156, a roller clutch 160, and a roller clutch inner race 208, among other things.

In one example of transmission 200, portions of the axial thrust load path through the transmission are changed by modifying or providing custom manufactured versions of reaction shell 204 and/or roller clutch inner race 208, and/or by including another bearing assembly, such as bearing assembly 142F, between reaction shell 204 and roller clutch inner race 208. These alterations modify the amount of component end play in various components within transmission 200, thus changing the axial thrust load path in the transmission.

In an example embodiment of transmission 200, roller clutch inner race 208 has a shorter axial length than roller clutch inner race 164 (as shown in FIG. 1B) and bearing assembly 142F is disposed between roller clutch inner race 208 and reaction shell 144 (as shown in FIG. 1B). Reducing the axial length of roller clutch inner race 208 provides room for the replacement of washer 188 (as shown in FIG. 1B) with bearing assembly 142F. Thus, roller clutch inner race 208 and bearing assembly 142F can be designed in concert with one another to substantially eliminate any end play that would have existed in roller clutch inner race 164 in transmission 100, thus relieving sun gear 124B and reaction shell splines 176 and bearing 142D from axial thrust loading and promoting an axial thrust load path 212.

Axial thrust load path 212 traverses, from left to right in FIG. 2, bearing assembly 142A, sun gear 124A, bearing assembly 142B, planetary carrier 128A, bearing assembly 142C, gear support housing 140A, a thrust washer 184, reaction shell 204 (or reaction shell 144 from FIG. 1B), bearing assembly 142F, roller clutch inner race 208, planetary carrier 128B, and bearing assembly 142E.

The axial length of roller clutch inner race 208 may be modified by methods known in the art or may be manufactured to have the appropriate axial length, for instance, when supplied as a component of a kit. In an alternative embodiment, bearing assembly 142F may be a thrust washer, similar to thrust washer 184 (FIG. 1B).

To further ensure the location of axial thrust load path 212 across the components described above, a reaction shell 204 may by included, which has a shorter axial length relative to reaction shell 144 of FIGS. 1A-C. For example, reaction shell 204 may be sized and configured so that a gap 216 exists between an edge 220 of the reaction shell closest to sun gear 124B. Gap 216 may provide end play in sun gear 124B, thus limiting the axial thrust load forces on the sun gear and bearing assembly 142D and promoting the transmission of axial thrust load forces generated by output shaft 120 along axial load force path 212. Reaction shell 204 can be provided, for example, by reducing the axial length of reaction shell 144 (FIG. 1B) by grinding or other methodologies known in the art or as a new reaction shell that is manufactured to have the appropriate axial length.

Figure 3:
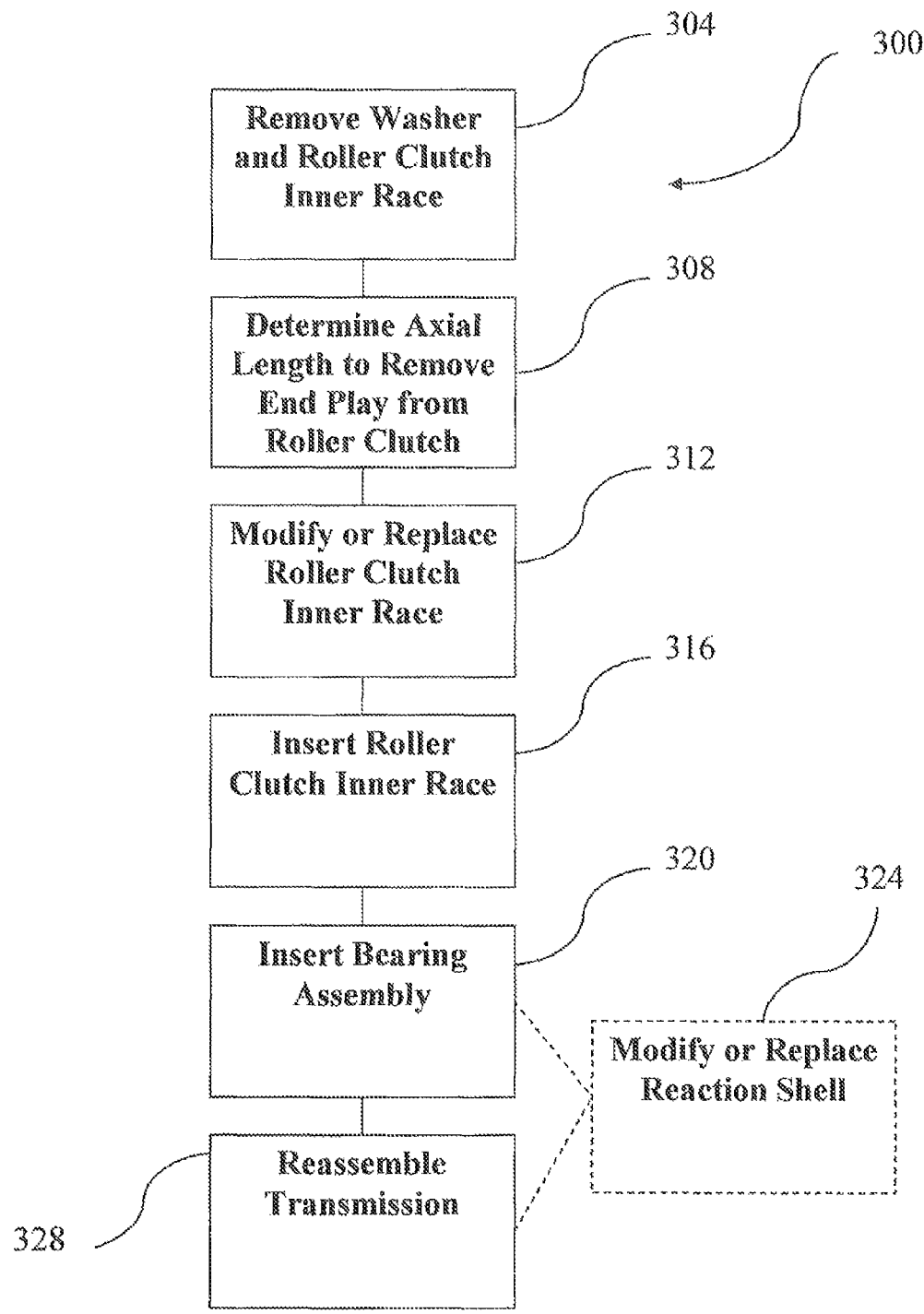
FIG. 3 is a flowchart illustrating a method for redistributing axial thrust loads in an automotive transmission according to an embodiment of the present invention.

FIG. 3 shows a flow diagram of an axial thrust load redistribution method 300 for modifying an original equipment transmission, such as transmission 100 (FIGS. 1A-C), to have an axial thrust load path that traverses a roller clutch inner race, such as axial thrust load path 212 (FIG. 2). With reference to FIGS. 1B and 3, washer 188 and roller clutch inner race 164 are removed from transmission 100 at step 304. At step 308, the axial length sufficient to remove end play from roller clutch inner race 164 is determined. Then, at step 312 the roller clutch inner race 164 is shortened via machining or other methods known in the art. The axial length of roller clutch inner race 164 should be sufficient so that when the roller clutch inner race and a bearing assembly are used together, such as bearing assembly 142F (FIG. 2), the resultant axial length of these two components is equal to or greater than the axial length determined at step 308, thus removing the component end play from roller clutch inner race 164 (FIG. 1B).

Roller clutch inner race 164 is then inserted into transmission 100 at step 316. At step 320, a bearing assembly or thrust washer, such as bearing assembly 142F (FIG. 2), is positioned proximate roller clutch inner race 164. An additional step in method 300 may include step 324, at which point reaction shell 144 is altered, typically by shortening the axial length of the reaction shell through machining or other methods known in the art, so that the reaction shell is sized to provide a gap, such as gap 216 (FIG. 2), between the reaction shell and sun gear 124B. In any event, whether reaction shell 144 is modified or not, at step 328, transmission 100 is reassembled for reinstallation into a vehicle.

It is understood that the appropriate axial length of roller clutch inner race 164 is determined, at least in part, by the size of bearing assembly 142F or a suitable substitute, such as a thrust washer. In an alternative embodiment, roller clutch inner race 164 can be reused if, for example, a bearing assembly or thrust washer has an axial length that, when combined with roller clutch inner race 164, removes the component end play from the roller clutch inner race, but does not move reaction shell 144 toward torque converter 108 to an extent that engagement between the reaction shell splines 176 and sun gear 124B is compromised. In another alternative embodiment of method 300, the roller clutch inner race 164 can be replaced at step 308 by prefabricated roller clutch inner race, such as roller clutch inner race 208. In any event, any alternative embodiments should result in an axial length of the combination of roller clutch race 164 (or 208) and bearing assembly 142F that is sufficient to remove the component end play from roller clutch inner race 164 (or 208).

Alternatively, reaction shell 144 may be replaced by a manufactured reaction shell 204 having a size and configuration such that gap 216 exists. Generally, the alterations to reaction shell 144 should be sufficient in amount to aid in the removal of sun gear 124B and the reaction shell splines 176 and bearing 142D from the axial thrust load path 212 (FIG. 2).

In some embodiments, bearing assembly 142F and roller clutch inner race 208 are conveniently provided as a kit for modifying an original equipment transmission prone to accelerated failure due to axial thrust loads caused by the torque converter, forces generated by the helical cut gears within the transmission, and suspension movement, such as transmission 100. Additionally, the kit can include reaction shell 208 along with bearing assembly 142F and roller clutch inner race 208. In either of the preceding embodiments, the kit may include instructions regarding the method of installation, such as method 300 described above. In other embodiments, bearing assembly 142D or roller clutch inner race 208 or reaction shell 208 may be provided individually with instructions for installation in a transmission, such as transmission 100.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A transmission comprising a reaction shell spline and having an original-equipment axial thrust load path traversing the reaction shell spline, the transmission comprising:
   a transmission housing;
   an output shaft rotatable relative to said transmission housing, said output shaft having a rotational axis;
   a reaction shell coaxial with said rotational axis and including a cylindrical first portion proximate said transmission housing, and a cylindrical second portion proximate said output shaft;
   a roller clutch inner race having an edge proximate said second portion of said reaction shell; and
   a bearing disposed between said reaction shell and said edge, wherein said bearing and said roller clutch inner race are sized and configured to remove the original-equipment axial thrust load path from the reaction shell spline.

2. A transmission according to claim 1, wherein said bearing assembly and said roller clutch inner race have an axial length that axially displaces said reaction shell toward the front of the transmission.

3. A transmission according to claim 2, further comprising a sun gear, and wherein said second portion has an end and is dimensioned so that a gap resides between said end and said sun gear.

4. A transmission according to claim 1, wherein of the combination of said bearing and said roller clutch inner race promote a diverted axial thrust load path that traverses said bearing and said roller clutch inner race.

5. A transmission according to claim 4, wherein said bearing comprises a roller-bearing assembly.

6. A transmission according to claim 4, wherein said bearing comprises a thrust washer.

7. A transmission according to claim 4, further comprising a planetary carrier and wherein the said diverted axial thrust load path traverses said planetary carrier.

8. A transmission according to claim 7, further comprising a sun gear, and wherein said bearing and said roller clutch inner race are further sized and configured to remove the original-equipment axial thrust load path from a second bearing disposed between said sun gear and said planetary carrier.

9. A transmission according to claim 1, wherein the transmission is GM transmission model 700-R4, 4L60, 4L60E, 4L65E, or 4L70.

10. A replacement kit for an automatic transmission having a preexisting roller clutch inner race and a preexisting spacer, the preexisting roller clutch inner race and the preexisting spacer having an original-equipment combined axial length, the replacement kit comprising:
 a replacement roller clutch inner race having an axial length that is shorter relative to the preexisting roller clutch inner race; and
 a replacement bearing sized such that said replacement roller clutch inner race and said replacement bearing have, when installed in the automatic transmission, a combined axial length greater than the original-equipment combined axial length.

11. A replacement kit according to claim 10, wherein the automatic transmission includes a sun gear located radially inward from the preexisting roller clutch inner race and an axial thrust load path that extends through the sun gear, said combined axial length being sufficient to reroute the axial thrust load path from the sun gear to said replacement roller clutch inner race.

12. A replacement kit according to claim 10, wherein the automatic transmission includes a sun gear, the replacement kit further including a reaction shell having a cylindrical first portion and a cylindrical second portion, said second portion being sized and configured to provide a gap between said reaction shell and the sun gear.

13. A replacement kit according to claim 10, wherein said bearing comprises a needle bearing assembly.

14. A replacement kit according to claim 10, wherein said bearing comprises a thrust washer.

15. A replacement kit according to claim 10, wherein said replacement roller clutch inner race and said replacement bearing are sized and dimensioned for GM transmission model 700-R4, 4L60, 4L60E, 4L65E, or 4L70.

16. A method of redistributing axial thrust loads in a transmission, comprising:
 removing a roller clutch race from the transmission;
 shortening the axial length of the roller clutch inner race;
 remounting the roller clutch inner race in the transmission; and
 inserting a bearing proximate the roller clutch inner race.

17. A method according to claim 16, further comprising removing a portion of a reaction shell from the transmission.

18. A method according to claim 16, further comprising providing a reaction shell having an axial length sufficient to induce component end play in a sun gear with the transmission.

19. A method according to claim 16, wherein said bearing comprises a needle bearing assembly.

20. A method according to claim 16, wherein said bearing comprises a thrust washer assembly.

21. A method according to claim 16, wherein the method is performed on a GM transmission model 700-R4, 4L60, 4L60E, 4L65E, or 4L70.

* * * * *